(12) United States Patent
Liu

(10) Patent No.: US 9,986,620 B2
(45) Date of Patent: May 29, 2018

(54) EYE-PROTECTION LAMP AND LIGHT INTENSITY ADJUSTING METHOD THEREOF

(71) Applicant: BOE Technology Group Co., Ltd., Beijing (CN)

(72) Inventor: Guanghui Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days. days.

(21) Appl. No.: 14/769,022

(22) PCT Filed: Apr. 17, 2015

(86) PCT No.: PCT/CN2015/076843
§ 371 (c)(1),
(2) Date: Aug. 19, 2015

(87) PCT Pub. No.: WO2016/086570
PCT Pub. Date: Jun. 9, 2016

(65) Prior Publication Data
US 2016/0316543 A1 Oct. 27, 2016

(30) Foreign Application Priority Data
Dec. 4, 2014 (CN) .......................... 2014 1 0735164

(51) Int. Cl.
*F21V 23/04* (2006.01)
*H05B 37/02* (2006.01)
(Continued)

(52) U.S. Cl.
CPC ......... *H05B 37/0218* (2013.01); *F21V 21/26* (2013.01); *F21S 6/003* (2013.01);
(Continued)

(58) Field of Classification Search
None
See application file for complete search history.

(56) References Cited

U.S. PATENT DOCUMENTS 4,787,735 A * 11/1988 Jolson .................... A61B 3/112
351/221
7,439,956 B1 * 10/2008 Albouyeh ............. G06F 1/1601
345/168
(Continued)

FOREIGN PATENT DOCUMENTS

CN 202534119 U 11/2012
CN 103148398 A 6/2013
(Continued)

OTHER PUBLICATIONS

May 4, 2016—(CN)—First Office Action Appn 201410735164.9 with English Tran.
(Continued)

*Primary Examiner* — Douglas W Owens
*Assistant Examiner* — Jianzi Chen
(74) *Attorney, Agent, or Firm* — Banner & Witcoff, Ltd.

(57) ABSTRACT

An eye-protection lamp comprises: a lampshade; a light emitting body, arranged inside the lampshade; a first photosensitive sensor, for detecting light intensity of the light emitting body; a second photosensitive sensor, for detecting ambient light intensity; a distance detecting device, for detecting a first distance (L1) between the light emitting body and a desktop under the lamp; an eye recognition device, for recognizing eyes and detecting a position of the eyes; a control unit, for adjusting the light intensity of the light emitting body according to the detected light intensity of the light emitting body, the ambient light intensity, the
(Continued)

first distance (L1), and the position of the eyes. A light intensity adjusting method of an eye-protection lamp is further provided.

11 Claims, 4 Drawing Sheets

(51) Int. Cl.
    *F21V 21/26*     (2006.01)
    *F21S 6/00*     (2006.01)

(52) U.S. Cl.
    CPC ....... *F21V 23/0442* (2013.01); *F21V 23/0464* (2013.01); *F21V 23/0471* (2013.01); *H05B 37/0227* (2013.01); *Y02B 20/46* (2013.01)

(56) References Cited

U.S. PATENT DOCUMENTS

| | | | |
|---|---|---|---|
| 7,564,368 B2 * | 7/2009 | Segall | H05B 37/02 340/331 |
| 8,212,499 B2 * | 7/2012 | Van Endert | H03K 17/94 315/291 |
| 8,253,341 B2 * | 8/2012 | Ku | F21K 9/00 315/185 S |
| 9,366,420 B2 * | 6/2016 | Kasuga | F21V 23/003 |
| 9,374,867 B2 * | 6/2016 | Lou | H05B 37/0227 |
| 2006/0278816 A1 | 12/2006 | Booty | |
| 2010/0182152 A1 * | 7/2010 | Andersson | A61B 3/113 340/573.1 |
| 2012/0326627 A1 * | 12/2012 | McDaniel, Jr. | H05B 33/0872 315/294 |
| 2013/0278150 A1 * | 10/2013 | Lou | H05B 37/02 315/155 |
| 2015/0002650 A1 * | 1/2015 | Yoshimura | H04N 5/4403 348/78 |

FOREIGN PATENT DOCUMENTS

| | | |
|---|---|---|
| CN | 103234145 A | 8/2013 |
| CN | 103442499 A | 12/2013 |
| CN | 203585929 U | 5/2014 |
| CN | 203784725 U | 8/2014 |
| CN | 204227167 U | 3/2015 |
| CN | 104482449 A | 4/2015 |
| JP | H1125723 A | 1/1999 |
| JP | 2005259437 A | 9/2005 |
| JP | 2006280938 A | 10/2006 |
| KR | 200132308 A | 4/1999 |
| KR | 2020090010868 U | 10/2009 |
| KR | 2020120002956 A | 5/2012 |

OTHER PUBLICATIONS

Jun. 29, 2015—International Search Report for Appn PCT/CN2015/076843 with Eng Trans of Written Opinion.
Aug. 4, 2016—(KR)—Office Action Appn 10-2015-7023042 with English Tran.
Jan. 16, 2017—(CN) Third Office Action Appn 201410735164.9 with English Tran.
Feb. 14, 2017—(KR) Final Office Action Appn 10-2015-7023042 with English Tran.
Jun. 16, 2017 (KR) Second Final Korean Office Action Appn 10-2015-7023042 with English Tran.

* cited by examiner

| The third distance L3 | $x_0 \sim x_1$ | $x_1 \sim x_2$ | $x_2 \sim x_3$ | $x_3 \sim x_4$ |
|---|---|---|---|---|
| the light intensity of the desktop under the lamp | $D_0$ | $D_1$ | $D_2$ | $D_3$ |

FIG. 3

Table 1 :

| The first distance L1 | $l_0$ | | | $l_1$ | | |
|---|---|---|---|---|---|---|
| The light intensity of the light emitting body (e) | $e_0$ | $e_1$ | $e_2$ | $e_3$ | $e_4$ | $e_5$ |
| the light intensity of the desktop under the lamp under a dark environment (d) | $d_0$ | $d_1$ | $d_2$ | $d_3$ | $d_4$ | $d_5$ |

FIG. 4

EYE-PROTECTION LAMP AND LIGHT INTENSITY ADJUSTING METHOD THEREOF

The application is a U.S. National Phase Entry of International Application No. PCT/CN2015/076843 filed on Apr. 17, 2015, designating the United States of America and claiming priority to Chinese Patent Application No. 201410735164.9 filed on Dec. 4, 2014. The present application claims priority to and the benefit of the above-identified applications and the above-identified applications are incorporated by reference herein in their entirety.

TECHNICAL FIELD

Embodiments of the invention relate to an eye-protection lamp and a light intensity adjusting method thereof.

BACKGROUND

In recent years, along with popularization of electronic products, the prevalence of myopia is significantly increased and presents a younger-age trend, which arouses concern of the whole society about eye health of young children. Major reasons which cause the myopia comprise improper brightness, incorrect reading and writing postures and other bad habits of using eyes. Meanwhile, using the eyes for overlong time will also cause eye strain.

In order to solve this problem, a light sensing module may be arranged on a shield of an eye-protection lamp to sense change of external light and prompt a user to operate, but in this solution, light intensity of light irradiated to a desktop under the lamp by the eye-protection lamp is not detected, and only an adjusting prompt is made according to the change of the external light, which cannot accurately detect light intensity of a position irradiated by the eye-protection lamp.

SUMMARY OF THE INVENTION

Embodiments of the invention relate to an eye-protection lamp and a light intensity adjusting method thereof.

An embodiment of the invention provides an eye-protection lamp, comprising: a lampshade; a light emitting body, arranged inside the lampshade; a first photosensitive sensor, arranged inside the lampshade and configured to detect light intensity of the light emitting body; a second photosensitive sensor, arranged outside the lampshade and configured to detect ambient light intensity; a distance detecting device, configured to detect a first distance between the light emitting body and a desktop under the lamp; an eye recognition device, configured to recognize eyes and detecting a position of the eyes; a control unit, configured to adjust the light intensity of the light emitting body according to the detected light intensity of the light emitting body, the ambient light intensity, the first distance, and the position of the eyes.

For example, the eye recognition device is used for detecting a second distance between the eyes and the device and detecting an included angle between the second distance and a vertical direction, the position of the eyes include the second distance and the included angle.

For example, the control unit is used for calculating the light intensity of the desktop under the lamp according to the light intensity of the light emitting body, the ambient light intensity and the first distance, and calculating a third distance between the eyes and the desktop under the lamp according to the first distance, the second distance and the included angle, and then adjusting the light intensity of the light emitting body according to the light intensity of the desktop under the lamp and the third distance.

For example, the eye-protection lamp may further comprises a prompt unit, and when the third distance is less than a preset distance, the control unit sends a work command to the prompt unit to enable the prompt unit to prompt.

For example, the control unit may be further used for determining a desired light intensity of the desktop under the lamp by looking up a light intensity adjusting table, so as to adjust the light intensity of the light emitting body; the control unit includes a storage sub-unit and the storage sub-unit stores the light intensity adjusting table.

An embodiment of the invention further provides a light intensity adjusting method of an eye-protection lamp, comprising: detecting light intensity of a light emitting body of the eye-protection lamp and ambient light intensity; detecting a first distance between the light emitting body and a desktop under the lamp; recognizing eyes and detecting a position of the eyes; adjusting the light intensity of the light emitting body according to the detected light intensity of the light emitting body, the ambient light intensity, the first distance, and the position of the eyes.

For example, the detecting position of the eyes includes: detecting a second distance between the eyes and a detection device, and detecting an included angle between the second distance and a vertical direction.

For example, the adjusting the light intensity of the light emitting body according to the detected light intensity of the light emitting body, the ambient light intensity, the first distance, and the position of the eyes includes: calculating the light intensity of the desktop under the lamp according to the light intensity of the light emitting body, the ambient light intensity and the first distance, and calculating a third distance between the eyes and the desktop under the lamp according to the first distance, the second distance and the included angle, and then adjusting the light intensity of the light emitting body according to the light intensity of the desktop under the lamp and the third distance.

For example, the adjusting the light intensity of the light emitting body according to the light intensity of the desktop under the lamp and the third distance includes: looking up a stored light intensity adjusting table according to the light intensity of the desktop under the lamp and the third distance, and determining a desired light intensity of the desktop under the lamp, so as to adjust the light intensity of the light emitting body.

For example, the light intensity adjusting method may further comprise: updating the light intensity adjusting table according to a manually adjusted light intensity.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 3 is an exemplary light intensity adjusting table according to an embodiment of the invention.

FIG. 4 is an example table that illustrates corresponding relationship between a light intensity of a light emitting body, a first distance L1 and a light intensity of the desktop under the lamp under a dark environment in an embodiment of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
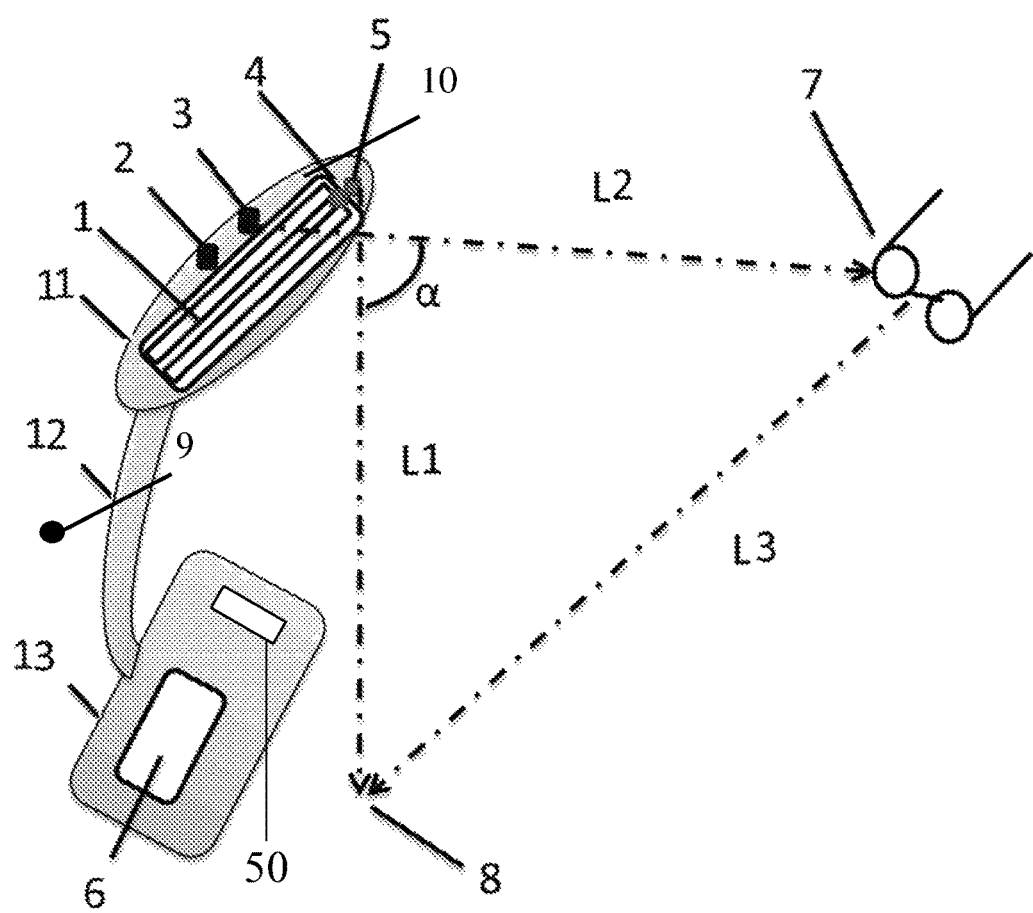
FIG. 1 is a structural schematic diagram of an eye-protection lamp in an embodiment of the invention.

As shown in FIG. 1, a reference number 7 denotes a user, and a reference number 8 denotes a desktop, or an object for example, a book on the desktop.

An embodiment of the invention provides an eye-protection lamp, comprising a lampshade 10, a light emitting body 1, a first photosensitive sensor 4, a second photosensitive sensor 2, a distance detection device 5, an eye recognition device 3 and a control unit 6. The lampshade 10 may be in any suitable shape, and may be made of any suitable material.

The light emitting body 1 may be of various types, for example, a fluorescent lamp, a light emitting diode (LED) lamp, an organic light emitting diode (OLED) lamp and/or a quantum dot lamp; of course, the embodiment of the invention is not limited thereto, and the light emitting body 1 may also be light emitting devices of other types. The light emitting body 1, for example, is arranged inside the lampshade 10.

The first photosensitive sensor 4 is arranged inside the lampshade 10 and used for detecting light intensity of the light emitting body 1

The second photosensitive sensor 2 is arranged outside the lampshade 10 and used for detecting ambient light intensity.

The distance detecting device 5 is used for detecting a first distance L1 between the light emitting body 1 and a desktop under the lamp. As when an user use a desklamp as a illumination tool for activities such as work and study, a common usage range is within the limited range under the lamp; for sake of convenience, during actual application, the first distance L1 between the light emitting body 1 and the desktop under the lamp may be specified as a distance from the distance detecting device 5 to the desktop or an object on the desktop vertically below the distance detecting device 5 or a distance from the distance detecting device 5 to a crossed point formed with the desktop and the object on the desktop along a certain direction. The certain direction may be changed along with position of the lampshade, namely, the desktop under the lamp may be viewed as a point of the desktop or the object on the desktop vertically below the distance detecting device 5 or a crossed point formed with the desktop or the object on the desktop along the certain direction. The distance detecting device 5 may be, for example, an infrared detecting device, or may be any other proper distance detecting device.

The eye recognition device 3 is used for recognizing eyes and detecting positions of the eyes. Exemplarily, the eye recognition device 3 is used for detecting a second distance L2 between eyes 7 and the eye recognition device and detecting an included angle α between the second distance L2 and a vertical direction, so the positions of the eyes 7 may be expressed by the second distance L2 and the included angle α. The eye recognition device 3 is, for example, a camera with eye recognition software.

The control unit 6 is used for adjusting the light intensity of the light emitting body according to the detected light intensity of the light emitting body, the ambient light intensity, the first distance L1, and the position of the eyes. The control unit 6 may be of various types, for example, CPU or PLC, and may be arranged at any proper position of the eye-protection lamp, for example, in a base 13.

Further, the control unit 6 may be further used for calculating light intensity of the desktop under the lamp according to the light intensity of the light emitting body, the ambient light intensity and the first distance L1. For example, a corresponding relationship among the light intensity of the light emitting body, the first distance L1 and the light intensity of the desktop under the lamp under a dark environment may be measured by experiment (e.g., Table 1 shown in FIG. 4 illustrates corresponding relationship between the light intensity of the light emitting body, the first distance L1 and the light intensity of the desktop under the lamp under a dark environment, and one of ordinary skill in the art can obtain Table 1 through experiment measurements), so that corresponding light intensity of the desktop under the lamp may be obtained by the actually detected light intensity of the light emitting body and the first distance L1, then actual light intensity of the desktop under the lamp is the corresponding light intensity plus the ambient light intensity. When the eye recognition device 3 and the distance detecting device 5 are close to each other, integrated into a body or positioned at the same height, as shown in FIG. 1, the first distance L1 may be directly adopted; when the eye recognition device 3 and the distance detecting device 5 are positioned at different heights, during calculation, the first distance L1 may be added or subtracted by a predetermined length related to a height difference or a distance therebetween. A third distance L3 between the eyes and the desktop under the lamp is calculated according to the first distance L1, the second distance L2 and the included angle α, for example, as shown in FIG. 1, the third distance is calculated according to the cosine law $L3^2 = L1^2 + L2^2 - 2L1L2 \cos \alpha$; then the light intensity of the light emitting body is adjusted according to the light intensity of the desktop under the lamp and the third distance L3.

Further, the eye-protection lamp may further comprise a prompt unit 9, the prompt unit 9 is, for example, positioned on the base 13 or a pillar 12. When the third distance L3 is less than a preset distance, the control unit sends a work command to the prompt unit to remind a user of keeping a proper viewing distance in a prompt manner. The prompt unit 9 may make a prompt through flashing of an indication lamp and/or sound emitted by a voice device. It should be understood that the prompt unit may be realized by hardware, firmware, software or any combination thereof according to actual needs.

In order to truly reflect an actual illumination condition, positions of the distance detecting device 5 and the eye recognition device 3 should be proper, for example, both of them are arranged at adjacent positions (in order to calculate the third distance L3 by using the cosine law) on the side surface of the lampshade 1. Of course, an embodiment of the invention is not limited thereto, and both of them may be mounted at any proper positions as long as the distance detecting device 5 can detect the first distance L1 and the eye recognition device 3 can detect the eyes, and positions in FIG. 1 are only schematic and do not represent actual positions.

It should be understood that the first photosensitive sensor 4, the second photosensitive sensor 2, the distance detecting device 5 and the eye recognition device 3 are all coupled with the control unit, and send collected data or processed data to the control unit, and the control unit is provided with a light emitting body control device for adjusting brightness of the light emitting body 1.

In addition, it should be pointed out that the first distance, the second distance and the third distance are only for distinguishing without actual sequential relationship.

Figure 2:
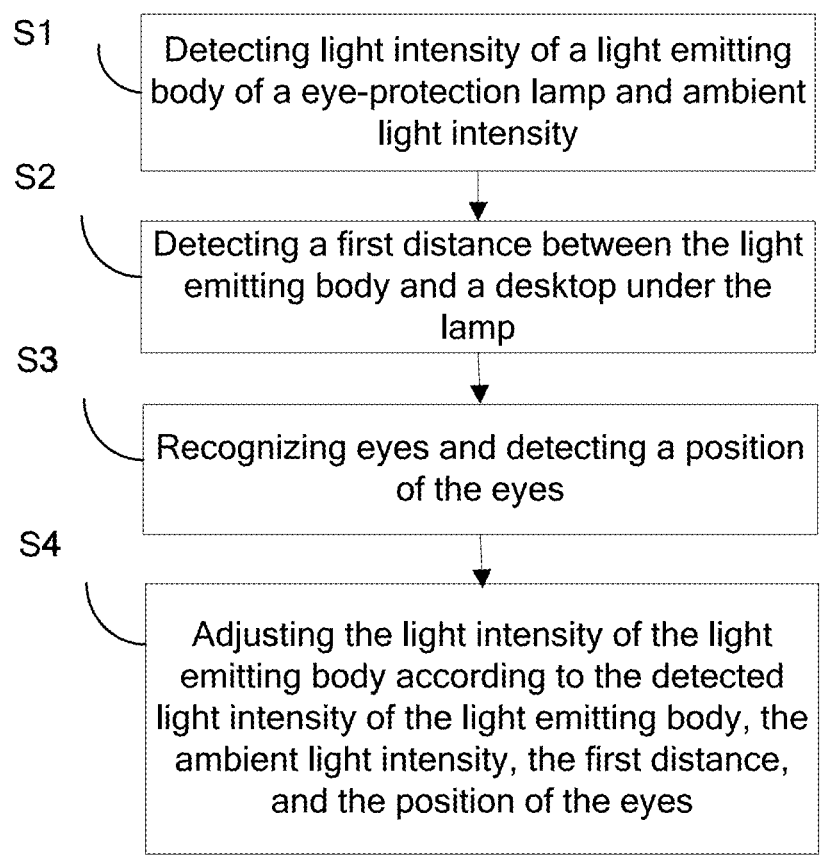
FIG. 2 is a flowchart of steps of a light intensity adjusting method of an eye-protection lamp in an embodiment of the invention.

Further, the control unit may be further used for determining a desired light intensity of the light emitting body by looking up a light intensity adjusting table. The control unit includes a storage sub-unit (not shown), the storage sub-unit stores the light intensity adjusting table, and the light intensity adjusting table includes: corresponding light intensities of the desktop under the lamp within a certain range of the third distance L3. An example of the light intensity adjusting table is shown in FIG. 3. As shown in FIG. 2, for a range of the third distance L3 to be x0~x1, the light intensity of the desktop under the lamp can be obtained as D0 through experiment measurement; for a range of the third distance L3 to be x1~x2, the light intensity of the desktop under the lamp can be obtained as D1 through experiment measurement; for a range of the third distance L3 to be x2~x3, the light intensity of the desktop under the lamp can be obtained as D2 through experiment measurement; and for a range of the third distance L3 to be x3~x4, the light intensity of the desktop under the lamp can be obtained as D3 through experiment measurement. At the moment, the light intensity of the light emitting body is adjusted in such a manner: when the third distance L3 is given, finding a range of the third distance L3 in the light intensity adjusting table, finding the corresponding light intensity of the desktop under the lamp, and then adjusting the light intensity of the light emitting body to enable the actually detected light intensity of the desktop under the lamp to be close to the corresponding light intensity of the desktop under the lamp in the light intensity adjusting table. It should be noted that the manner is not unique, a function relationship between the light intensity of the desktop under the lamp and the third distance L3 may also be established, so as to directly determine the desired light intensity of the desktop under the lamp by calculation.

Empirical values obtained according to experiment may be stored in the light intensity adjusting table, and of course, the empirical values may be adjusted and amended according to input of the user and the like. For example, the control unit is further used for remapping the light intensity adjusting table according to manual adjustment (described hereinafter), so as to update the light intensity of the light emitting body, namely, the corresponding light intensity of the desktop under the lamp in the certain range of the third distance L3 is replaced with the adjusted light intensity of the desktop under the lamp.

An operating principle of the eye-protection lamp of an embodiment of the invention is: detecting the light intensity of the light emitting body by the first photosensitive sensor 4 arranged inside the lampshade; detecting the ambient light intensity by the second photosensitive sensor 2 arranged outside the lampshade; detecting the first distance L1 between the light emitting body and the desktop under the lamp by the distance detecting device 5 so as to calculate the light intensity of the desktop under the lamp, further detecting the positions of the eyes by the eye recognition device 3, calculating the distance between the eyes and the desktop under the lamp, and finally adjusting the light intensity of the light emitting body by the control unit, so that the light intensity of the desktop under the lamp is matched with the distance between the eyes and the desktop under the lamp, for example, consistent with the light intensity adjusting table.

Further, the eye-protection lamp according to the embodiment of the invention may further comprise a manual control device 50 for manually adjusting the light intensity of the light emitting body. The manual control device 50 comprises a touch control panel and/or a manual adjusting knob, and a user can adjust the light intensity according to his/her own need. Therefore, the real-time property and flexibility of light intensity adjusting are improved.

The eye-protection lamp of the embodiment of the invention may further comprise a curved arm 11, which connects a pillar 12 to the lampshade 10 and is used for adjusting position of the lampshade 10. Therefore, the position of the lampshade 10 may be manually adjusted.

With the eye-protection lamp of the embodiment of the invention, the distance between the light emitting body and the desktop under the lamp is detected by the distance detecting device, the eye recognition device is adopted to detect the positions of the eyes, the photosensitive sensors are adopted to respectively detect the ambient light intensity and the light intensity of the light emitting body of the eye-protection lamp, and the light intensity of the desktop under the lamp is calculated by the control unit, so the light intensity of the eye-protection lamp is intelligently adjusted according to the distance between the eyes and the desktop under the lamp and the actual light intensity of the desktop under the lamp so as to arrive at an aim of healthy eye protection.

As shown in FIG. 2, an embodiment of the invention further provides a light intensity method of an eye-protection lamp, comprising:

Step S1: detecting light intensity of a light emitting body of the eye-protection lamp and ambient light intensity, wherein, the light emitting body is, for example, a fluorescent lamp, a light emitting diode (LED) lamp, an organic light emitting diode (OLED) lamp and/or a quantum dot lamp, of course, the embodiment of the invention is not limited thereto, and the light emitting body may also be a light emitting device of any other type.

For example, the light intensity of the light emitting body of the eye-protection lamp is detected by a first photosensitive sensor and the ambient light intensity of the light emitting body is detected by a second photosensitive sensor.

Step 2: detecting a first distance between the light emitting body and a desktop under the lamp.

For example, the first distance between the light emitting body and the desktop under the lamp is detected by a distance detecting device. As when an user uses a desklamp as a illumination tool for activities such as work and study, a common usage range is within the limited range under the desklamp, during actual application, the first distance is a distance from the light emitting body to the desktop under the lamp or an object on the desktop or a distance from the light emitting body to a crossed point formed with the desktop or the object on the desktop along a certain direction. The certain direction may be changed along with position of the lampshade, wherein the light emitting body is arranged inside the lampshade, namely, the desktop under the lamp may be viewed as a point on the desktop or the object on the desktop vertically below the distance detecting device or a crossed point formed with the desktop or the object on the desktop along the certain direction.

Step 3: recognizing eyes and detecting a position of the eyes.

For example, the detecting the position of the eyes includes: detecting a second distance L2 between the eyes and the device, and detecting an included angle α between the second distance L2 and a vertical direction, so the position of the eyes may be expressed by the second distance L2 and the included angle α.

Step 4: adjusting the light intensity of the light emitting body according to the detected light intensity of the light emitting body, the ambient light intensity, the first distance, and the position of the eyes.

For example, with reference to FIG. 1, the light intensity of the desktop under the lamp is calculated according to the light intensity of the light emitting body, the ambient light intensity and the first distance, and a third distance between the eyes and the desktop under the lamp is calculated according to the first distance, the second distance and the included angle, and then the light intensity of the light emitting body is adjusted according to the light intensity of the desktop under the lamp and the third distance. For example, a corresponding relationship among the light intensity of the light emitting body, the first distance L1 and the light intensity of the desktop under the lamp under a dark environment may be measured by experiment, so corresponding light intensity of the desktop under the lamp may be obtained by the actually detected light intensity of the light emitting body and the first distance L1, then actual light intensity of the desktop under the lamp is the corresponding light intensity plus the ambient light intensity; according to the first distance L1 (when the eye recognition device and the distance detecting device are close to each other, integrated into a body or positioned at a same height, as shown in FIG. 1, the first distance L1 may be directly adopted; when the eye recognition device and the distance detecting device are positioned at different heights, during calculation, the first distance L1 may be added or subtracted by a predetermined length related to a height difference or distance therebetween), the second distance L2 and the included angle α, the third distance L3 between the eyes and the desktop under the lamp is calculated, for example, as shown in FIG. 1, the third distance is calculated according to the cosine law $L3^2=L1^2+L2^2-2L1L2\cos\alpha$; then the light intensity of the light emitting body is adjusted according to the light intensity of the desktop under the lamp and the third distance L3.

Further, when the third distance L3 is less than a preset distance, prompt is performed through flashing of an indication lamp and/or sound emitted by a voice device so as to remind a user of keeping a proper viewing distance.

In addition, it should be pointed out that the first distance, the second distance and the third distance are only used for differentiating one distance from another distance without requiring or implying that these distances have any such actual sequence.

Further, a stored light intensity adjusting table is looked up according to the light intensity of the desktop and the third distance so as to determine a desired light intensity of the desktop under the lamp and adjust the light intensity of the light emitting body. Wherein, the light intensity adjusting table includes: corresponding light intensities of the desktop under the lamp within a certain range of the third distance L3. At the moment, the light intensity of the light emitting body is adjusted in such a manner: when the third distance L3 is given, finding a range of the third distance L3 in the light intensity adjusting table, finding the corresponding light intensity of the desktop under the lamp, and then adjusting the light intensity of the light emitting body to enable the actually detected light intensity of the desktop under the lamp to be close to the corresponding light intensity of the desktop under the lamp in the light intensity adjusting table. It should be noted that the manner is not unique, a function relationship between the light intensity of the desktop under the lamp and the third distance L3 may also be established, so as to directly determine the desired light intensity of the desktop under the lamp by calculation.

Empirical values obtained according to experiment are stored in the light intensity adjusting table, and of course, the light intensity adjusting table may be remapped according to manually adjusted light intensity, so as to update the light intensity of the light emitting body, namely, the original corresponding light intensity of the desktop under the lamp in the certain range of the third distance L3 is replaced with the adjusted light intensity of the desktop under the lamp.

According to the light intensity adjusting method of embodiments of the present invention, the light intensity of the desktop under the lamp is calculated by detecting the distance between the light emitting body and the desktop under the lamp and detecting the position of the eyes, the ambient light intensity and the light intensity of the light emitting body of the eye-protection lamp, so that the light intensity of the eye-protection lamp is intelligently adjusted according to the distance between the eyes and the desktop under the lamp and the actual light intensity of the desktop under the lamp so as to arrive at an aim of healthy eye protection.

It should be understood that the eye-protection lamp of the disclosure may apply the light intensity adjusting method of the eye-protection lamp of the disclosure, and the light intensity adjusting method of the eye-protection lamp may be realized by devices or functional modules of the eye-protection lamp, so if there is no conflict, both of their features may be shared, namely, the features of the eye-protection lamp may be applied to the light intensity adjusting method of the eye-protection lamp, and the features of the light intensity adjusting method of the eye-protection lamp may be applied to the eye-protection lamp.

It should be noted that in this text, relation terms such as "first" and "second" are only used for differentiating one entity or operation from another entity or operation without requiring or implying that these entities or operations have any such actual relationship or sequence. In addition, terms "comprise", "include" or other variants mean to cover non-exclusive comprising, so a process, method, object or device comprising a series of elements not only comprises these elements, but also comprises other unclearly listed elements, or further comprises inherent elements of such process, method, object or device. In a case of no more limitation, an element defined by the phrase "comprises one" does not exclude other same elements in the process, method, object or device comprising the element.

It should be explained that directional or positional relationships shown by terms such as "upper", "lower" are directional or positional relationships shown as in the drawings, which only means to facilitate description of the invention and simplify the description, but do not indicate or imply that the devices or components must have specific directions, or be constructed or operated in the specific directions, and are not limitative of the invention. Unless expressly stipulated or defined, terms "mounted", "connected" and "linked" should be broadly understood, for example, they may be fixedly connected, detachably connected, or integrally connected; may be mechanically connected or electrically connected; or may be directly connected, indirectly connected by a medium, or internally communicated between two components. For those ordinarily skilled in the art, the specific meanings of the terms in the disclosure can be understood according to specific conditions.

The foregoing embodiments merely are exemplary embodiments of the invention, and not intended to define the scope of the invention, and the scope of the invention is determined by the appended claims.

The application claims priority of Chinese Patent Application No. 201410735164.9 filed on Dec. 4, 2014, the disclosure of which is incorporated herein by reference in its entirety as part of the present application.

What is claimed is:

1. An eye-protection lamp, comprising:
a lampshade;
a light emitting body, arranged inside the lampshade;
a first photosensitive sensor, arranged inside the lampshade and configured to detect light intensity of the light emitting body;
a second photosensitive sensor, arranged outside the lampshade and configured to detect ambient light intensity;
a distance detecting device, configured to detect a first distance between the light emitting body and a desktop under the lamp;
an eye recognition device, configured to recognize eyes and detect a position of the eyes; and
a control unit, configured to adjust the light intensity of the light emitting body according to the detected light intensity of the light emitting body, the ambient light intensity, the first distance, and the position of the eyes,
wherein the eye recognition device is configured to detect a second distance between the eyes and the eye recognition device and to detect an included angle between the second distance and a vertical direction, and the position of the eyes comprises the second distance and the included angle,
wherein the control unit is configured to adjust the light intensity of the light emitting body at least by:
calculating an actual light intensity of the desktop under the lamp according to the light intensity of the light emitting body, the ambient light intensity and the first distance;
calculating a third distance between the eyes and the desktop under the lamp according to the first distance, the second distance and the included angle; and
adjusting the light intensity of the light emitting body according to the actual light intensity of the desktop under the lamp and the third distance, and
wherein the third distance is calculated using a following equation:

$$L3^2 = L1^2 + L2^2 - 2L1L2\cos\alpha,$$

where L1, L2 and L3 denote the first distance, the second distance and the third distance respectively, and $\alpha$ denotes the included angle between the second distance and the vertical direction.

2. The eye-protection lamp according to claim 1, further comprising a prompt unit, wherein when a third distance is less than a preset distance, the control unit sends a work command to the prompt unit to enable the prompt unit to prompt.

3. The eye-protection lamp according to claim 2, wherein the control unit is further configured to determine stored light intensity of the desktop under the lamp that corresponds to the third distance by looking up a light intensity adjusting table, and adjust the light intensity of the light emitting body to match the actual light intensity of the desktop under the lamp with the stored light intensity of the desktop under the lamp.

4. The eye-protection lamp according to claim 1, wherein the control unit is further configured to determine desired light intensity of the desktop under the lamp by looking up a light intensity adjusting table, so as to adjust the light intensity of the light emitting body.

5. The eye-protection lamp according to claim 1, further comprising a prompt unit, wherein when the third distance is less than a preset distance, the control unit sends a work command to the prompt unit to enable the prompt unit to prompt.

6. The eye-protection lamp according to claim 1, wherein the control unit is further configured to determine stored light intensity of the desktop under the lamp that that corresponds to the third distance by looking up a light intensity adjusting table, and to adjust the light intensity of the light emitting body to match the actual light intensity of the desktop under the lamp with the stored light intensity of the desktop under the lamp.

7. A light intensity adjusting method of an eye-protection lamp, comprising:
detecting light intensity of a light emitting body of the eye-protection lamp and ambient light intensity;
detecting a first distance between the light emitting body and a desktop under the lamp;
recognizing eyes and detecting a position of the eyes; and
adjusting the light intensity of the light emitting body according to the detected light intensity of the light emitting body, the ambient light intensity, the first distance and the position of the eyes,
wherein the detecting the position of the eyes comprises:
detecting a second distance between the eyes and a detection device, and detecting an included angle between the second distance and a vertical direction,
wherein the adjusting the light intensity of the light emitting body according to the detected light intensity of the light emitting body, the ambient light intensity, the first distance and the position of the eyes comprises:
calculating an actual light intensity of the desktop under the lamp according to the light intensity of the light emitting body, the ambient light intensity and the first distance, and calculating a third distance between the eyes and the desktop under the lamp according to the first distance, the second distance and the included angle, and then adjusting the light intensity of the light emitting body according to the actual light intensity of the desktop under the lamp and the third distance, and
wherein the third distance is calculated using a following equation:

$$L3^2 = L1^2 + L2^2 - 2L1L2\cos\alpha,$$

where L1, L2 and L3 denote the first distance, the second distance and the third distance respectively, and $\alpha$ denotes the included angle between the second distance and the vertical direction.

8. The method according to claim 7, wherein the adjusting the light intensity of the light emitting body according to the actual light intensity of the desktop under the lamp and the third distance comprises:

looking up a stored light intensity adjusting table according to the third distance to obtain a stored light intensity of the desktop under the lamp that corresponds to the third distance, and adjusting the light intensity of the light emitting body to match the actual light intensity of the desktop under the lamp with the stored light intensity of the desktop under the lamp.

9. The method according to claim 8, further comprising:
updating a corresponding element of the light intensity adjusting table according to a manually adjusted light intensity.

10. The method according to claim 7, further comprising:
updating a corresponding cell of the light intensity adjusting table according to a manually adjusted light intensity.

11. The method according to claim 7, further comprising:
updating a corresponding cell of the light intensity adjusting table according to a manually adjusted light intensity.

\* \* \* \* \*